United States Patent [19]

Ogura et al.

[11] Patent Number: 5,159,648
[45] Date of Patent: Oct. 27, 1992

[54] IMAGE PICKUP APPARATUS HAVING A MASK FOR DEFINING THE EXTENT OF THE IMAGE TO BE REPRODUCED

[75] Inventors: Wataru Ogura; Hiroshi Kamijima; Hirokazu Koide; Hiroshi Yoshida, all of Nagano, Japan

[73] Assignee: Chinon Kabushiki Kaisha, Nagano, Japan

[21] Appl. No.: 758,360

[22] Filed: Sep. 10, 1991

Related U.S. Application Data

[63] Continuation of Ser. No. 338,044, Apr. 14, 1989, abandoned.

[30] Foreign Application Priority Data

May 27, 1988 [JP] Japan .................................. 63-129894
Jul. 19, 1988 [JP] Japan .................................. 63-179599

[51] Int. Cl.$^5$ ............................................. G06K 9/42
[52] U.S. Cl. .................................... 382/47; 358/449; 358/451
[58] Field of Search .................... 382/47, 58; 358/227, 358/449, 451

[56] References Cited

U.S. PATENT DOCUMENTS

| | | | |
|---|---|---|---|
| 3,573,472 | 4/1971 | Madalo | 382/32 |
| 3,624,605 | 11/1971 | Aagard | 382/32 |
| 3,644,889 | 2/1972 | Skenderoff et al. | 382/32 |
| 3,906,219 | 9/1975 | Stauffer | 356/125 |
| 4,615,621 | 10/1986 | Allen et al. | 356/399 |
| 4,771,473 | 9/1988 | Sugiura | 358/451 |
| 4,888,650 | 12/1989 | Abuyama | 358/451 |
| 4,893,195 | 1/1990 | Tada et al. | 358/451 |
| 4,896,177 | 1/1990 | Kazami et al. | 354/145.1 |
| 4,905,095 | 2/1990 | Yamada | 382/47 |
| 4,905,096 | 2/1990 | Moriya | 358/451 |
| 4,912,567 | 3/1990 | Nakajima et al. | 358/451 |
| 4,947,269 | 8/1990 | Yamada | 382/47 |

Primary Examiner—Jose L. Couso

[57] ABSTRACT

An image pickup device for viewing an image on a wall surface includes a mask for defining the extent of the focal plane of a viewed image which will be reproduced by a linear image sensor positioned to scan the masked area. Binary data representative of the scanned image is generated and controls a printer which reproduces the masked portion of the image. The size of the masked image is restored to the full size capability of the printer by a data scaling circuit which precludes the need for utilizing a zoom lens in the image pickup device.

8 Claims, 5 Drawing Sheets

IMAGE PICKUP APPARATUS HAVING A MASK FOR DEFINING THE EXTENT OF THE IMAGE TO BE REPRODUCED

This application is a continuation, continuation-in-part, of application Ser. No. 338,044 filed on Apr. 14, 1989, now abandoned.

BACKGROUND OF THE INVENTION

1. Field of the Invention

The present invention relates to an image pickup apparatus, and particularly relates to an image pickup apparatus for use in an apparatus for printing out characters or figures drawn on a wall, such as a blackboard, a white board, a notice-board or the like.

2. Discussion of the Related Art and Problems to Be Solved

A known apparatus for printing out characters, figures, etc. drawn on a blackboard or the like onto paper, is a so-called electronic blackboard. The electronic blackboard uses a blackboard (or a whiteboard) having a scanning function so that characters, figures, etc. drawn on the blackboard can be printed out onto paper by means of an integrally provided thermal printer unit on the basis of scanning information. Besides, there is an apparatus in which an original document is disposed at a predetermined position in a manner similar to that of a copying machine and the original document is read out by a scanner so as to be printed out.

Despite the fact that there are such known apparatus for printing out characters and/or figures on a special blackboard having a scanning function and for printing out the contents of an original document mounted at a predetermined position, it has heretofore been impossible to reproduce characters, figures and/or spatial sketches drawn on an ordinary blackboard provided with no scanning function, or drawn on a wall, a board or the like provided at the outdoors, onto paper as information. That is, it is impossible to print out those drawings on paper.

To solve such difficulties, the applicant of this application has proposed a so-called image pickup and printing apparatus in which characters, figures or the like drawn on various walls such as ordinary blackboard or the like are made incident through a lens, an angle of view is determined while monitoring the incident image through a view finder, the image is scanned by a linear image sensor, and a printer is operated in response to an image signal obtained by the scanning so that the characters, figures, or the like comprising that image are printed out on paper.

Although the above-mentioned image pickup printing apparatus can pickup the image of characters, figures or the like drawn on a wall as they are or pick up the image while changing an angle of view by using a zoom lens, it has been impossible to pick up the image while changing the aspect ration of the image in order to pick up a specific part of the image.

To better solve this existing need, applicant has conceived an apparatus in which members for limiting the scope of an image to be picked-up are provided for the above-mentioned linear image sensor and the displacement of the members is adjustable so that it is possible to pick up only a specific portion of those characters, figures or the like, which comprise the image.

In the case of thus picking-up only a specific portion, it is preferable to magnify that portion of the image to be printed. As a method for magnifying the image, although it could be magnified by a zoom lens or the like, such a method is disadvantageous in view of its cost because it is necessary to use an expensive zoom lens.

It is therefore desired to magnify the image to be outputted through data processing.

In the case of magnifying an image by a known general image processing method, binary data are held in a memory and the data are expanded by bit processing. For example, a known method to convert three-bit data into four-bit data is illustrated by the use of a 4/3-times conversion table shown in FIG. 9.

In such known method, not only a memory for holding data is required, but the magnifying power of the apparatus is limited. Moreover, since a conversion pattern appears in the printing output, the resolution of the apparatus deteriorates.

SUMMARY OF THE INVENTION

It is therefore an object of the present invention to provide an image pickup apparatus which can attain a function, for example, to take only a row or only a column on a wall.

It is another object of the present invention to provide an image pickup apparatus in which bit data can be expanded without use of any conversion table, a desired magnifying power can be obtained and the output resolution can be maintained.

In order to attain the above objects, according to the present invention, the image pickup apparatus comprises: a view finder for monitoring an image taken in through an image pickup lens; a linear image sensor arranged to be driven along a focal plane of the image; and masking means arranged to be displaceable along the focal plane to thereby determine a scope of image to be picked-up on the basis of the displacement thereof.

Preferably, the image pickup apparatus further comprises: a columnar light source disposed so as to be opposite to the linear image sensor located at its initial position with the masking means elongated in the direction of movement of the linear image sensor; and effective area judging means which judges that among a plurality of picture elements constituting the linear image sensor located at the initial position, those picture elements producing outputs each of which is not smaller than a predetermined threshold value are effective picture elements Preferably, the masking means includes a pair of masking members arranged to be slidable in the direction opposite to each other. The apparatus further comprises a position sensor provided on one of the pair of masking members located on the side of the initial position of the linear image sensor at an edge of the one masking member on the side opposite to the initial position of the linear image sensor so that the position sensor can detect the movement of the linear image sensor to a position corresponding to the position sensor, and effective area judging means for judging an effective area defined by the pair of masking members on the basis of a detection signal from the position sensor.

According to the present invention, an image, such as characters, figures, or the like, drawn on a wall or the like, taken in through the pickup lens is changed by extracting a desired part of the image by operating the masking means while monitoring the image through the view finder, and only the desired part of the image extracted by means of the masking means is picked up.

Owing to this configuration, it is possible to attain a function, for example, to pick up only one line or one row of an image on a wall.

If the light source located in opposition to the linear image sensor disposed at its initial position with the masking member interposed between the light source and the linear image sensor is lighted, the picture elements of the linear image sensor are irradiated with the light from the light source. However, of the picture elements, those picture elements masked by the masking means receive the light reduced through the masking means so that the respective outputs of those masked picture elements are in low levels. Therefore, the output of each picture element is inputted in advance, and if the output is not smaller than a predetermined threshold value, it is possible to judge that the picture element producing the output is an effective picture element not masked by the masking means. Thus, it is possible to judge an effective area to be printed out on the basis of the result of the judgement as to the effective picture element.

Further, in the case where the masking means is constituted by a pair of masking members arranged to be slidable in the direction of movement of the linear image sensor and in the direction opposite to each other, the movement of the linear image sensor to the edge portion of one of the pair of masking members is detected by the position sensor and the effective area defined by the pair of masking members on the basis of the detection signal of the position sensor.

To derive the image data according to the present invention, the image pickup apparatus comprises a linear image sensor which is subject to sub-scanning by means of a motor to obtain an image pickup signal and the image pickup signal is converted into binary data as an output of the apparatus. This image pickup is provided with: scale factor setting means for desirably setting an output scale factor; a clock signal source for producing a clock signal with a frequency proportional to the scale factor set by the scale factor setting means; data holding means including a plurality of stages of signal holding portions, for sequentially holding the binary data in response to the clock signal; and variable speed means for changing the speed of the motor in accordance with the scale factor set by the scale factor setting means.

In the apparatus according to the present invention, if the scale factor is set to N by the scale factor setting means, the number of clock signals increases by N times in proportion to the scale factor. The binary data representing the result of picking-up by means of the linear image sensor are held in the data holding means every time each of the above-mentioned N-times clock signals is produced. That is, the binary data are held in the state where the data are divided into N-times divisions, so that an image signal magnified by N times can be obtained if the held data are outputted. Then, with respect to the sub-scanning, the motor speed is changed in accordance with the scale factor so that the sub-scanning speed is reduced into, for example, 1/N. This means that one scanning line is divided into N so that the number of the scanning lines are increased by N times.

As the result, it is possible to obtain binary data similar to those obtained by zooming the optics by N times.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

An embodiment of the present invention will be described with referenced to the drawings.

Figure 1:
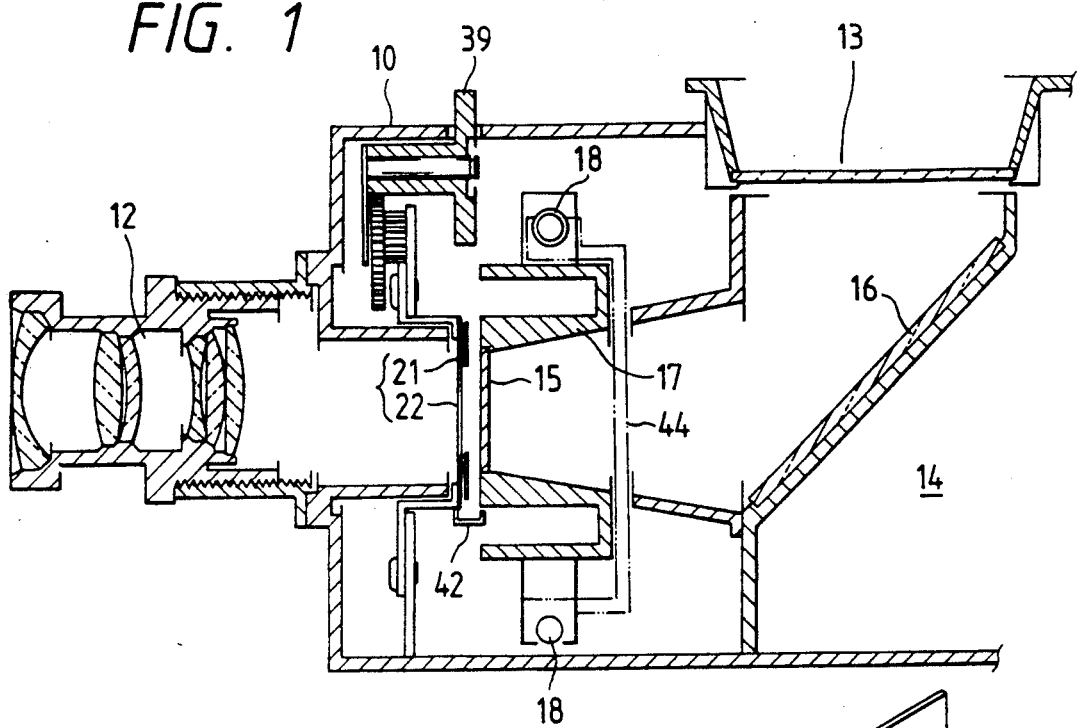
FIG. 1 is a sectional view illustrating an embodiment of an image pickup apparatus according to the present invention.

In FIG. 1, an image pickup lens 12 is provided on the front of a body case 10 (in the left side in the drawing), a view finder 13 is provided in the upper surface of the body case 10, and a not-shown printer for printing out picked-up information is housed in a space 14 at the inside rear of the body case 10 (in the right side in the drawing).

An image of characters, figures, etc. drawn on a wall or the like is taken in through the image pickup lens 12 and focused as an inverted image onto a reticle 15 provided in a focal plane of the image. The focused image can be observed visually through a window of the view finder 13 with an inclined mirror 16 provided at the rear of the focused image.

Figure 2:
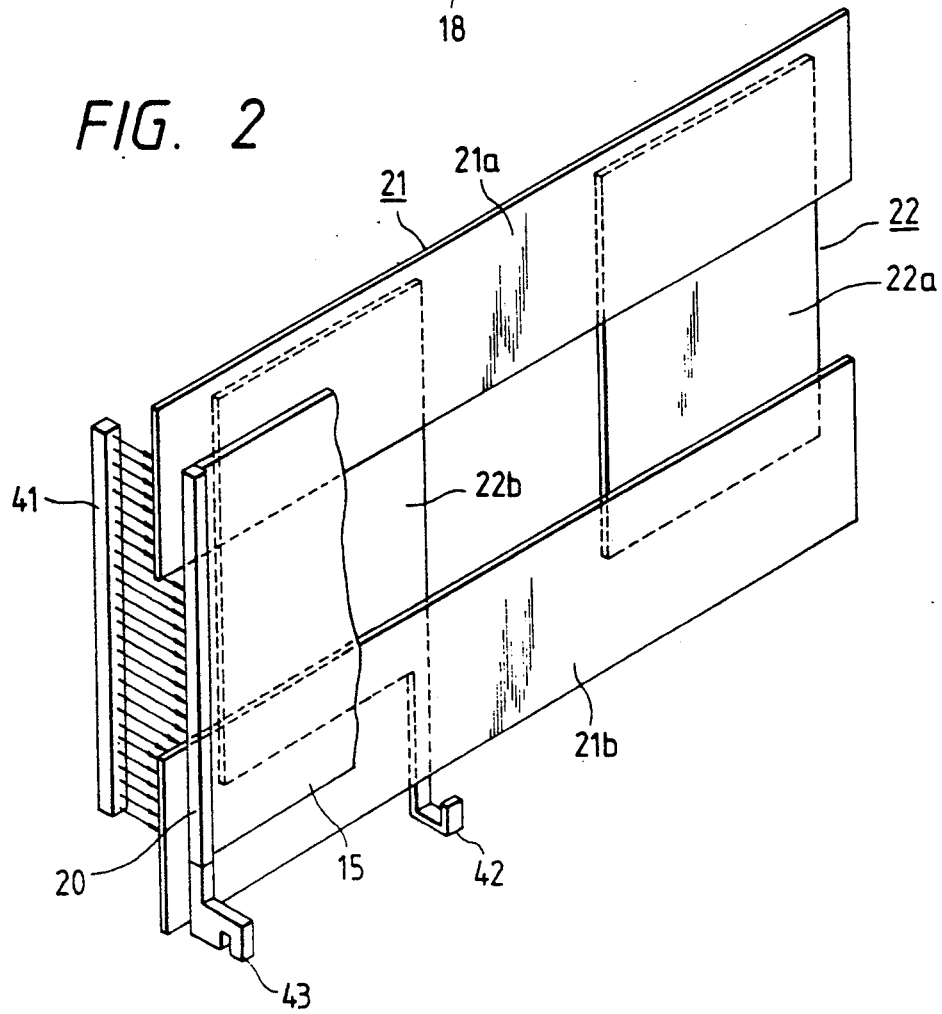
FIG. 2 is a partially broken perspective view partially illustrating the relation among the linear image sensor, the masking members, and so on in FIG. 1.

The above-mentioned reticle 15 is supported so as to be slidable in the horizontal direction along upper and lower guide poles 18 provided in the horizontal direction (in the direction perpendicular to the paper plane of the drawing), and the reticle 15 is arranged to be driven in the horizontal direction by a not-shown stepping motor. A linear image sensor 20 is provided on one side of the reticle 15 as illustrated in FIG. 2. A line CCD having a plurality of picture elements arrayed in the vertical direction is used as the linear image sensor 20.

A vertical area masking member (hereinafter abbreviated to "V-masking member") 21 and a horizontal area masking member (hereinafter abbreviated to "H-masking member") 22 are provided in front of the reticle 15 (in the left side in FIG. 1).

Figure 3:
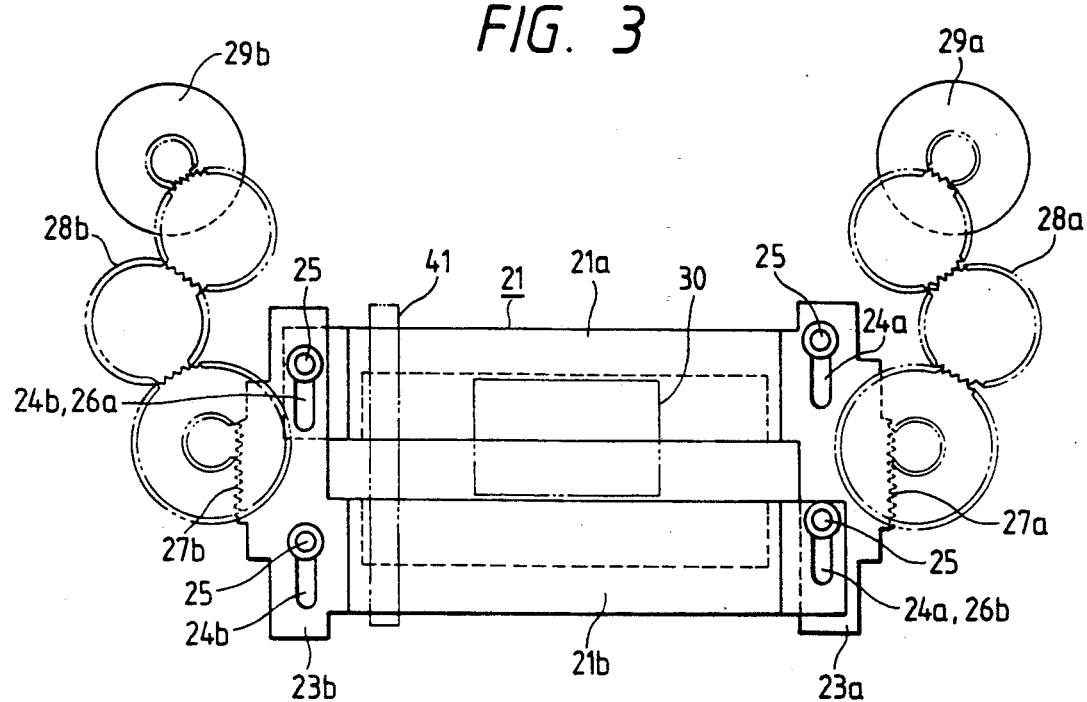
FIG. 3 is a front view partially illustrating the masking member in the vertical direction and the operating mechanism thereof in FIG. 1.

The V-masking member 21 includes a pair of, upper and lower, colored transparent plates (hereinafter referred to as "marker") 21a and 21b which are elongated respectively in the horizontal direction, that is, in the direction of movement of the reticle 15, and which are arranged side by side in the vertical direction so as to be vertically movable independently of each other. That is, as illustrated in FIG. 3, the illustrated right end of the upper marker 21a is integrally attached to the upper left side of a supporter 23a elongated in the vertical direction, and in the same manner, the illustrated left end of the lower marker 21b is integrally attached to the lower right side of another supporter 23b elongated in the vertical direction. The respective supporters 23a and 23b are provided with vertically elongated holes 24a and 24b and are supported so as to be movable in the vertical direction by means of guide pins 25 which are provided on the body case 10 and slidably inserted through the respective elongated holes 24a and 24b. Thus, the respective one ends of the markers 21a and 21b are attached to their corresponding supporters 23a and 23b, and the other ends thereof are supported by the guide pins 25 through elongated holes 26a and 26b. Consequently the markers 21a and 21b move vertically as their corresponding supporters 23a and 23b move vertically.

Rack gears 27a and 27b are formed in the vertical direction on the outer sides of the supporters 23a and 23b respectively and connected to corresponding operation dials 29a and 29b through corresponding gear mechanisms 28a and 28b respectively. The operation portions, that is, the outer circumferential surfaces, of the respective operation dials 29a and 29b are exposed outside the body case 10, so that the operation dials 29a and 29b can be externally manually rotated so as to vertically move the corresponding markers 21a and 21b to thereby adjust the quantity of masking in the vertical direction relative to a maximum pickup area 30.

Figure 4:
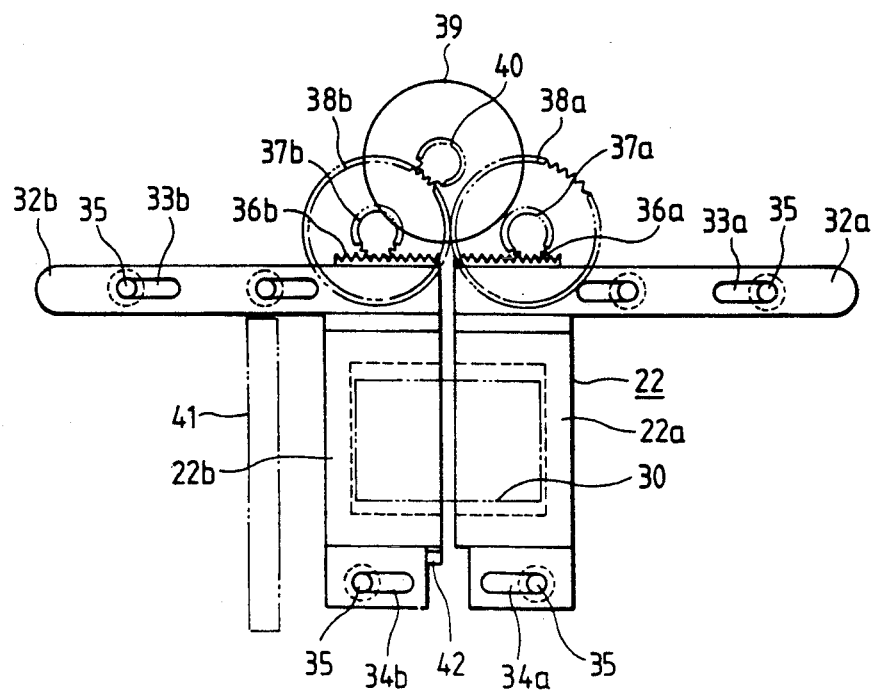
FIG. 4 is a front view partially illustrating the masking member in the horizontal direction and the operating mechanism thereof in FIG. 1.

On the other hand, the above-mentioned H-masking member 22 is constituted by a pair of, left and right, colored transparent plates, that is, markers 22a and 22b which are elongated in the vertical direction respectively and which are arranged side by side so as to be movable horizontally in the direction opposite to each other. That is, as illustrated in FIG. 4, the respective upper ends of the markers 22a and 22b are integrally attached to corresponding supporters 32a and 32b which are elongated in the horizontal direction. Horizontally elongated holes 33a and 33b are formed respectively in the supporters 32a and 32b. Further, horizontally elongated holes 34a and 34b are formed in the lower potions of the respective markers 22a and 22b. Guide pins 35 provided on the body case 10 are slidably inserted through these elongated holes 33a, 33b, 34a and 34b respectively, so that the markers 22a and 22b and the supporters 32a and 32b integrally attached to those respective markers are supported by the corresponding guide pins 35 so as to be slidable in the horizontal direction.

Rack gears 27a and 27b are formed on the respective upper sides of the supporters 32a and 32b so as to engage with corresponding gears 37a and 37b. Gears 38a and 38b integrally formed on the respective gears 37a and 37b are arranged to engage with each other so as to rotate in the direction opposite to each other. Further, the gear 38b is arranged so as to engage also with a gear 40 of an operation dial 39. The operation portion, that is, the outer circumferential surface, of the operation dial 39 is exposed outside the upper side of the body case 10, so that the operating dial 39 can be externally manually rotated so as to horizontally move the pair of right and left markers 22a and 22b in the direction opposite to each other through the gears 40, 38a, 38b, 37a and 37b and the rack gears 36a and 36b In FIG. 2, there is provided a columnar light source 41 which includes, for example, a number of LEDs linearly arranged as an LED array. The columnar light source 41 is disposed in opposition to the line CCD, that is, the linear image sensor 20 located at its initial position, with the masking members 21 and 22 interposed between the columnar light source 41 and the linear image sensor 20. The initial position of the linear image sensor 20 means a position where the reticle 15 having the linear image sensor 20 attached thereon covers the pickup area 30 illustrated in FIGS. 3 and 4, before movement of the reticle 15.

Of the pair of markers 22a and 22b included in the H-masking member 22, the marker 22b is provided with a position detecting marker flag 42 at its lower end portion on a counterintitial position side (the right side in FIGS. 2 and 4), that is, on the side opposite to the initial position of the linear image sensor 20 (the left side in FIGS. 2 and 4). On the other hand, the linear image sensor 20 is provided, at its lower end, with a position detecting sensor (for example, a light switch) 43. This sensor 43 produces a detection signal when the linear image sensor 20 reaches the edge portion of the marker 22b so as to be opposite to the marker flag 42 provided there.

As illustrated in FIG. 1, a shade 44 is slidably attached to the guide pole 18 in order to shade light from the window of the view finder 13 in picking up an image.

Figure 5:
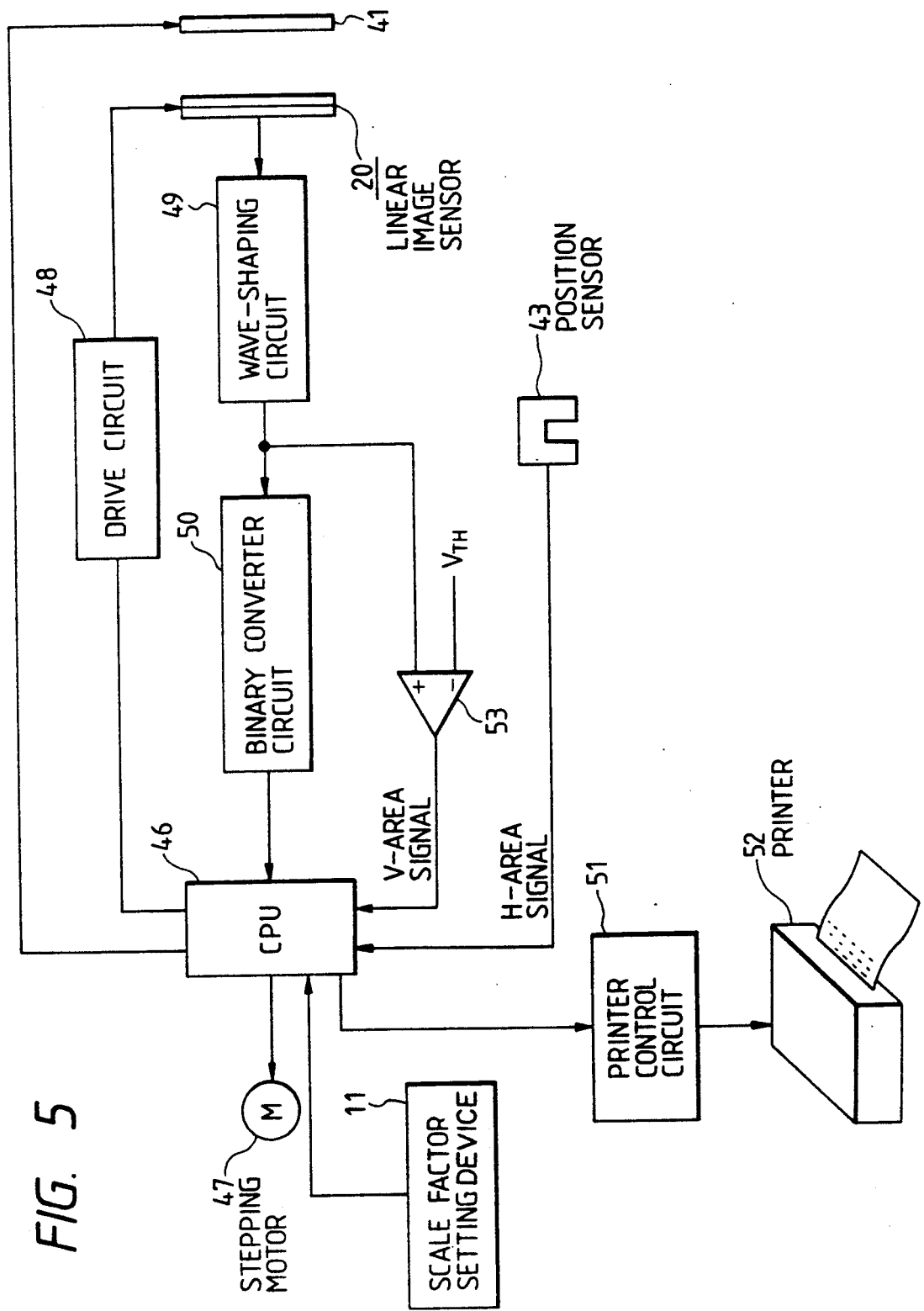
FIG. 5 is a block diagram illustrating a control system used according to the present invention.

FIG. 5 illustrates a control system the whole of which is generally controlled by a central processing unit (hereinafter abbreviated to "CPU") 46. That is, the CPU 46 supplies a lighting command to the columnar light source 41 in response to a pickup command externally applied to the CPU 46. Moreover, the CPU 46 supplies a driving pulse to a stepping motor 47 in response to the above-mentioned pickup command. The stepping motor 47 is arranged to move the reticle 15 and the linear image sensor 20 integrally attached to the reticle 15 along the focal plane of the reticle. Further, the CPU 46 makes the linear image sensor 20 operate through a driving circuit 48 in response to the above-mentioned pickup command. An output signal from each picture element of the linear image sensor 20 is wave-shaped by a wave-shaping circuit 49 and the wave-shaped signal is then digitized by a binary conversion circuit 50. The CPU 46 outputs printing data to a printer control circuit 51 on the basis of the binary pickup signal.

On the other hand, the output signal of each picture element wave-shaped by the wave-shaping circuit 49 is also applied to a comparator 53 and compared with a threshold value $V_{TH}$. The output signal of the comparator 53, that is, a vertical area signal (hereinafter abbreviated to "V-area signal"), which is one of the area signals indicating the desired pickup scope, is applied as an area judging signal to an area judging device included in the CPU 46, wherein the area judging functions are performed. To the area judging device, also is applied the output signal of the above-mentioned sensor 43, that is, a horizontal area signal (hereinafter abbreviated to "H-area signal") is applied as another area judging signal for detecting the desired pickup scope in the horizontal direction.

Further, a scale factor setting device 11 for setting the output scale factor to a desired value is provided in connection with the CPU 46.

Figure 7:
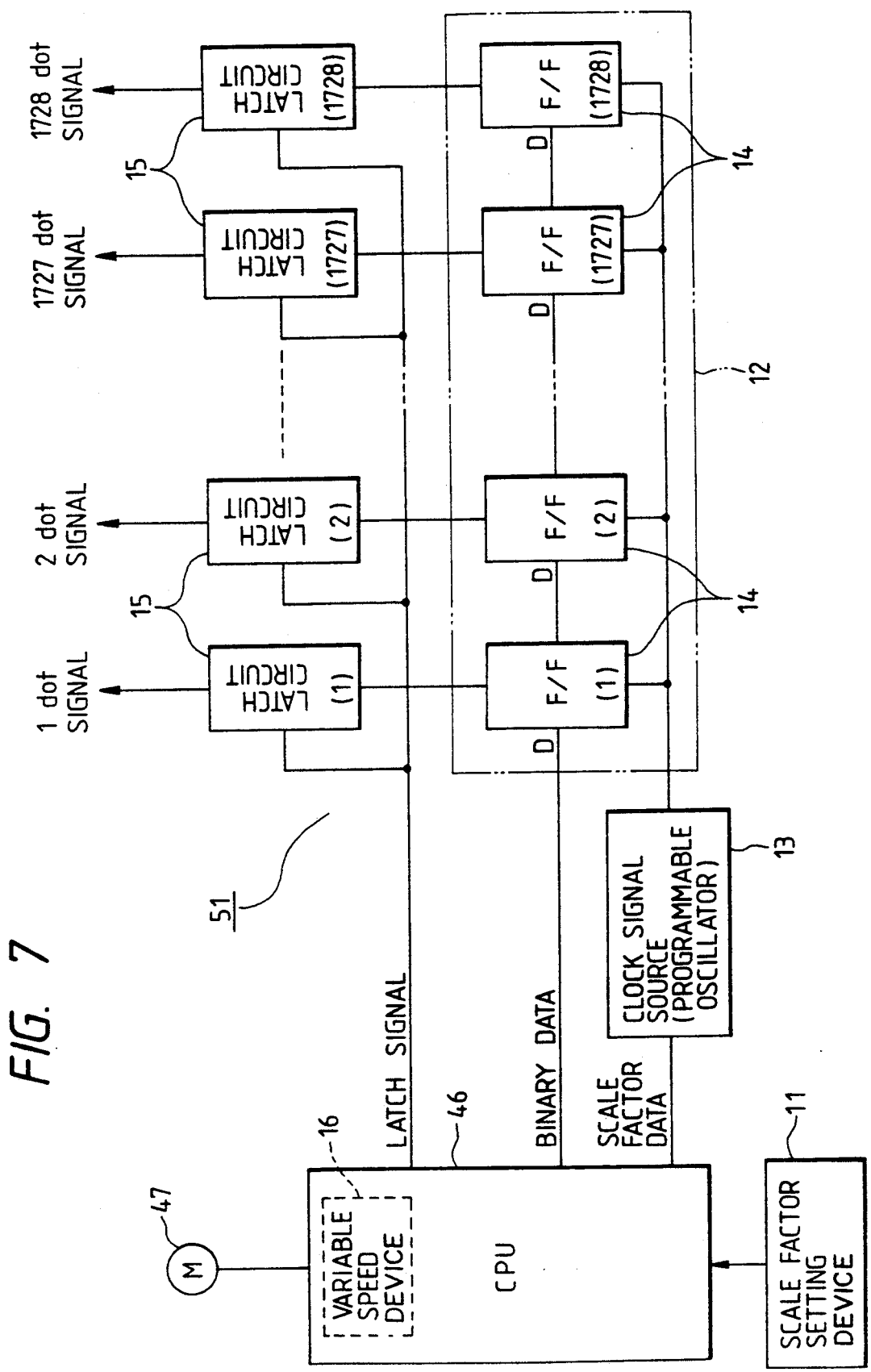
FIG. 7 is an arrangement diagram illustrating main portions in an embodiment of the image pickup apparatus according to the present invention.

The printer control circuit 51 is provided with a data holding device 12 and a clock signal source 13, as illustrated in FIG. 7. The data holding device 12 may be a shift register having a plurality of signal holding stages (1728 stages in the illustrated example) 14 which may include respective flip-flops. The shift register 12 holds binary data, that is, a serial signal, produced by the CPU 46 sequentially every time the above-mentioned clock signal is applied thereto. Corresponding to the flip-flops 14 in the respective states, there are provided latch circuits 15 which are equal in number to the flip-flops 14. In response to a latch signal generated by the CPU 46 when the CPU 46 has been supplied with 1728 pulses of the clock signal from the clock signal source 13 so that binary data have been stored in the respective stage flip-flops 14 of the shift register 12, the latch circuits 15 receive the data from the corresponding stage flip-flops 14 and hold them as respective dot signals for a 1728-dot line head.

The clock signal source 13 is arranged to produce a clock signal with a frequency proportional to the scale factor set by the above-mentioned scale factor setting device 11, and the clock signal source 13 may include a programmable oscillator for changing the frequency of the output clock signal in accordance with the input data or the scale factor data.

On the other hand, with respect to the sub-scanning direction, the speed of the motor 47 is changed by means of a variable speed device 16 formed in the CPU 46, in accordance with the set value of the scale factor, for example, in inverse proportion to the set value of the scale factor.

In the above-described configuration, first, a user sets the image pickup lens 12 toward a wall on which characters, figures or the like to be printed out are drawn, and then confirms through the window of the view finder 13 whether a desired image is put therein. While seeing the image projected on the window of the view finder 13, the user moves either one or both of the V-masking members 21 and the H-masking members 22 so as to desirably establish the scope of the specific portion to be picked up in the above-mentioned image.

Figure 6:
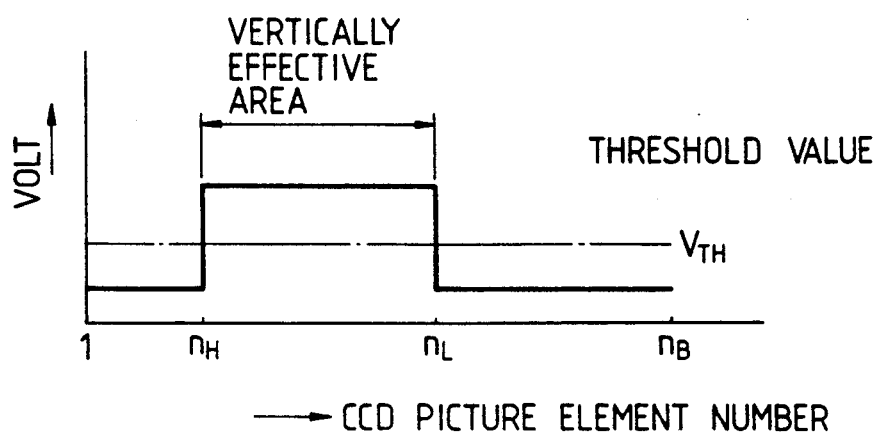
FIG. 6 is a waveform chart for explaining the operation for obtaining a vertical area signal in FIG. 5.

Next, if the user gives a pickup command, the CPU 46 turns on the columnar light source 41 to thereby irradiate the linear image sensor 20 located at its initial position. At the same time, the CPU 46 actuates the linear image sensor 20 through the driving circuit 48 so as to produce an output signal of one line of the image. At this time, the output of the linear image sensor 20 is in such a state as illustrated in FIG. 6. In FIG. 6, the axis of abscissa represents the numbers of the respective picture elements and the axis of ordinate represents the output voltage of the respective picture elements. That is, since the V-masking member 21 is positioned between the columnar light source 41 and the linear image sensor 20, the respective quantities of light incident to the picture elements (1~nH) and the picture elements (nL~nB) located in the positions masked by the V-masking member 21 are largely reduced so that the output voltages of those picture elements become low levels. The output voltage of each picture element is therefore compared with the threshold value $V_{TH}$ in the comparator 53 to thereby obtain the above-mentioned V-area signal as the result of comparison. On the basis of the V-area signal, the area judging device of the CPU 46 judges effective picture elements (nH~nL) and determines whether the outputs which are not lower than the threshold value $V_{TH}$ to thereby detect image information within that vertically effective area.

The value of $V_{TH}$ is empirically determined and provided by a suitable voltage source.

Figure 8:
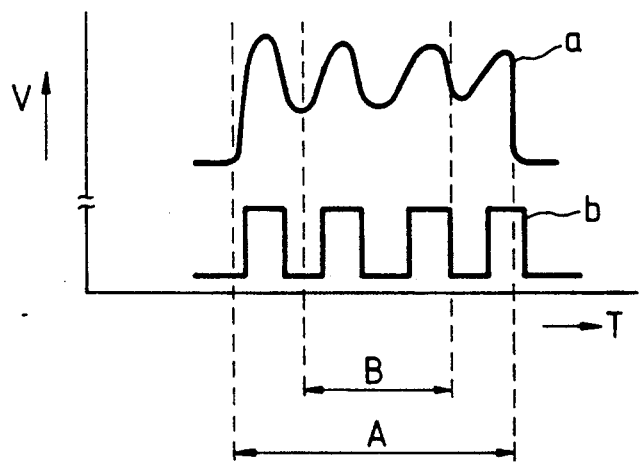
FIG. 8 is a characteristic diagram for explaining the pickup scope.
Figure 9:
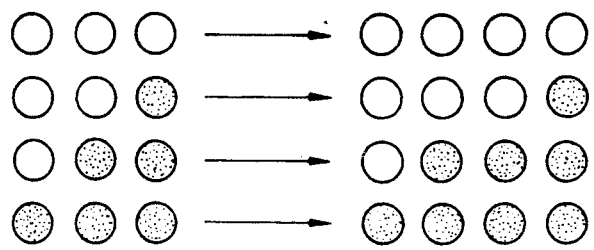
FIG. 9 is a diagram for explaining the bit processing by use of a conventional conversion table.

In FIG. 8, the symbol A represents a maximum pickup scope A, and the symbol B represents a pickup scope masked by the masking members.

When the linear image sensor 20 is moved in the horizontal direction along the focal plane by the stepping motor 47, the linear image sensor 20 receives an image taken in through the image pickup lens and produces an output signal from each picture element thereof. Although this output signal a is wave-shaped and binary as illustrated by the line b, the CPU 46 supplies only the data (the scope B in this case) related to a portion corresponding to the effective area, determined as described above, to the printer control circuit 51.

Since only a portion of the image corresponding to the scope B is picked up here, it is preferable to magnify that portion to the size of the area of maximum pickup scope A, and the scale factor is therefore set to a value A/B times by the scale factor setting device 11.

The CPU 46 supplies scale factor data (for example, 8-bit data) to the clock signal source 13 on the basis of this set value of the scale factor so as to increase the frequency of the output clock signal of the clock signal source 13 to a value A/B times. That is, the 1728 pulses of the clock signal are produced in a transfer period of binary data within the scope B illustrated in FIG. 8, and the binary data are sequentially held by the respective stage flip-flops 14 of the shift register 12. When the transfer of the binary data of one line has been completed, that is, after the data have been held in the respective stage flip-flops 14 of the shift register 12, the latch signal is generated from the CPU 46 so that the data in the respective stages are transferred to the latch circuits 15 and held therein as the respective dot signals for the line head (which has 1728 dots). This means that printing by means of this line head is performed with the scale factor A/B.

Then, the CPU 46 changes the speed of the motor 47 through the variable speed device 16 on the basis of the set value of the scale factor (A/B) to thereby reduce the speed in the sub-scanning direction by B/A times. While the speed in the sub-scanning direction is reduced, the feeding speed of paper in the printer 52 is kept constant, and therefore the thus obtained printing data are magnified in the sub-scanning direction by A/B times.

The scale factor setting device 11 may be arranged to operate in response to the masking members for limiting the pickup scope to thereby automatically set the scale factor in inverse proportion to the pickup scope which may be changed by the masking members. Alternatively, the scale factor may be determined in the CPU 46 on the basis of a ratio of the limited image scope to the maximum value while the respective V and H area signals are inputted into the CPU 46. In this case, if the scale factors in the V and H directions are different from each other, the smaller one of them is selected by the CPU 46 as a magnifying scale factor for the system.

Although the programmable oscillator has been shown as an example of the clock signal source 13, a voltage-controlled oscillator may be used. In this case, it is a matter of course that a D/A converter is required.

As has been described above, according to the present invention, it is possible to set an output scale factor of binary pickup data to a desired value, to change the aspect ratio of an image, to magnify a crosswise image, or the like, that is, it is possible to expand the scope of use of the apparatus.

Next, the detection of a horizontally effective area will be described. In response to the above-mentioned pickup command, the CPU 46 supplies a driving pulse to the stepping motor 47 to cause the stepping motor 47 to move the linear image sensor 20 in the horizontal direction along the focal plane. When the linear image sensor 20 reaches the right edge of the left marker 22b illustrated in FIG. 4, the sensor 43 detects the marker flag 42 and produces an output signal. The quantity of movement of the sensor 43 before the sensor 43 produces the detection signal is detected on the basis of the number of the driving pulses $P_L$ supplied to the stepping motor 47. The number of the driving pulses $P_C$ required for stepping motor 47 before the sensor 43 reaches the center of the pickup area 30 is known. Therefore, if the number of pulses ($P_C - P_L$) is added to this center position, it is possible to specify the horizontally effective area.

When the linear image sensor 20 is moved in the horizontal direction along the focal plane by the stepping motor 47, the linear image sensor 20 receives an image taken in through the image pickup lens 12 and produces output signals from the respective picture elements thereof. The CPU 46 supplies only that data related to a portion of the image corresponding to the effective area, determined as described above, to the printer control circuit 51. As a result, the printer 52 prints out only the image portion within the scope defined by the masking members 21 and 22.

The columnar light source 41 is again lighted when the linear image sensor 20 comes back to its initial position. At that time, the linear image sensor 20 can be correctly stopped at its initial position, by sensing that position at which the quantity of light received by the linear image sensor 20 becomes maximum.

As has been described above, since it is possible to perform a function to pick up an image while designating a special portion of the image or changing an aspect ratio of the image by means of the masking members 21 and 22, the scope of use of the apparatus can be greatly expanded.

Moreover, in setting an image pickup lens toward a subject to be picked up, it suffices to roughly set the image pickup lens so as to include the pickup scope because of provision of the masking members, although it has been necessary to adjust the pickup scope accurately while seeing the image through a view finder. This is because trimming can be performed easily by means of the masking members 21 and 22 after setting of the image pickup lens.

Further, since only the data within the pickup scope are processed, it is possible to eliminate time required to scan an unnecessary portion and it is not necessary to transfer unnecessary data.

In the foregoing embodiments, although a horizontally effective area is detected by a signal produced when the sensor 43 detects the marker flag 42 provided on the marker 22b and the known number of pulses corresponding to the distance from the initial position to the central position of the pickup area 30, the present invention is not to be limited by the specific embodiment of detection. For example, flags may be provided on both the markers 22a and 22b so that the sensor 43 detects the flags to thereby detect an effective area. In this case, both the markers 22a and 22b may be arranged to move independently of each other.

Although both the vertical and horizontal masking members 21 and 22 are provided in the above embodiment, it is a matter of choice that only one of them may be provided.

As has been described above, according to the present invention, it is possible to easily trim an image, such as characters, figures, or the like, drawn on a wall or the like into a desired scope and pickup the image in the trimmed scope.

We claim:

1. An image pickup apparatus comprising:
means for receiving an image on a focal plane;
linear image sensor means adjacent said focal plane for detecting said image and providing image pickup signals representative thereof;
motor means for driving said linear image sensor means to scan said image on said focal plane;
converter means for providing binary data as a function of said image pickup signals;
scale factor setting means for setting a desired output scale factor for said binary data;
clock means responsive to said scale factor setting means for producing a clock signal with a frequency proportional to said scale factor;
data holding means including a plurality of signal holding stages responsive to said binary data and said clock signal for sequentially receiving and holding said binary data;
variable speed means responsive to said scale factor setting means for controlling the speed of said motor means as a function of said output scale factor; and
masking means arranged to be positioned over said focal plane to thereby determine the scope of the image to be picked up by said apparatus.

2. An image pickup apparatus according to claim 1, further comprising pickup scope limiting means provided for said linear image sensor means, said scale factor setting means being arranged to operate in response to said pickup scope limiting means so that said scale factor setting means sets said scale factor in inverse proportion to a change in the pickup scope.

3. An image pickup apparatus comprising:
lens means for viewing an image;
viewfinder means for monitoring an image taken in through said lens means by natural and incoherent light;
linear image sensor means for scanning and detecting said image, arranged to be driven along a focal lane of said image;
masking means arranged to be positioned over said focal plane to thereby determine the scope of the image to be picked up by said apparatus, the scope of said masking means being changed as desired by an operator;
means for receiving an image through said lens on said focal plane;
means in said linear image sensor means for providing image pickup signals representative thereof;
motor means for driving said linear image sensor means to scan said image on said focal plane;
converter means for providing binary data as a function of said image pickup signals;
scale factor setting means for setting a desired output scale factor for said binary data as a function of said scope as determined by said masking means;
clock means responsive to said scale factor setting means for providing a clock signal with a frequency proportional to said scale factor;

data holding means including a plurality of signal holding stages responsive to said binary data and said clock signal for sequentially receiving and holding said binary data;

variable speed means responsive to said scale factor setting means for controlling the speed of said motor means as a function of said output scale factor; and reproducing means responsive to said data holding means for reproducing said image on a retainable record medium.

4. The image pickup apparatus of claim 3, wherein said reproducing means comprises a printer and said retainable record medium comprises a printable web.

5. The image sensing apparatus of claim 3, which further comprises:

columnar light source means disposed opposite to and for illuminating said linear image sensor means through at least a portion of said masking means in an initial position of said image sensor means prior to scanning said image;

said linear image sensor means including a plurality of picture elements disposed thereon to define a scanning line of maximum extent for scanning a maximum area on said focal plane and providing outputs representative of portions of said image;

means for establishing a threshold value for said outputs of said linear image sensing means; and effective area judging means responsive to said outputs for determining which of said outputs exceed said threshold value when said linear image sensor means is in its initial illuminated position to establish an extent of the area of said image to be scanned consistent with the scope thereof as determined by said masking means.

6. The image sensing apparatus of claim 5, wherein said masking means comprises:

vertical area defining means for masking a defined vertical image area to be picked in said focal plane and selectively masking said linear image sensor means from said columnar light source means at said initial position to define active picture elements correlated with said defined vertical image area; and horizontal area defining means for masking a defined horizontal image area superimposed on said defined vertical image area on said focal plane to define the effective area to be scanned by said linear image sensor means.

7. The image sensing apparatus of claim 6, wherein said horizontal area defining means further comprises position sensing means responsive to the maximum scanning position of said linear image sensor means to provide a position signal representative of a completed scan of said effective area thereby; and said effective area judging means includes means responsive to said position signal to establish another extent of the area of said image to be scanned consistent with the scope thereof as determined by said masking means.

8. An image pickup apparatus according to claim 7, in which said masking means includes a pair of masking members arranged to be slidable in the direction of movement of said linear image sensor and in opposition to each other, one of said pair of masking members being located on the same side of said effective area as said initial position of said linear image sensor and being provided with a position sensor positioned at an edge of said effective area.

* * * * *